United States Patent
Berkebile et al.

(10) Patent No.: US 6,926,295 B2
(45) Date of Patent: Aug. 9, 2005

(54) POWERED DEPLOYABLE RUNNING BOARD

(75) Inventors: Thomas E. Berkebile, Toledo, OH (US); V-Bond Lee, Woodbridge (CA); John Wejtaszek, Holly, MI (US)

(73) Assignee: Decoma International Inc., Concord (CA)

( * ) Notice: Subject to any disclaimer, the term of this patent is extended or adjusted under 35 U.S.C. 154(b) by 16 days.

(21) Appl. No.: 10/643,064

(22) Filed: Aug. 18, 2003

(65) Prior Publication Data

US 2004/0108678 A1 Jun. 10, 2004

Related U.S. Application Data

(60) Provisional application No. 60/404,543, filed on Aug. 16, 2002.

(51) Int. Cl.$^7$ ................................................. B60R 3/00
(52) U.S. Cl. ..................... 280/166; 280/164.1; 280/163
(58) Field of Search .............................. 280/166, 164.2, 280/164.1, 163; 105/425, 430, 447, 448

(56) References Cited

U.S. PATENT DOCUMENTS

| | | | |
|---|---|---|---|
| 1,616,793 A | | 2/1927 | Goss |
| 1,867,228 A | | 7/1932 | McWhirter |
| 2,118,557 A | | 5/1938 | Hamilton |
| 3,651,767 A | * | 3/1972 | Findeklee ................ 280/166 |
| 3,986,724 A | * | 10/1976 | Rivinius ................... 280/166 |
| 4,020,920 A | | 5/1977 | Abbot |
| 4,185,849 A | | 1/1980 | Jaeger |
| 4,188,889 A | | 2/1980 | Favrel |
| 4,231,583 A | | 11/1980 | Learn |
| 4,356,894 A | * | 11/1982 | Everett ..................... 280/166 |
| 4,708,355 A | | 11/1987 | Tiede |
| 4,982,974 A | * | 1/1991 | Guidry ................... 280/164.2 |
| 5,224,723 A | | 7/1993 | Hatas |
| 5,230,288 A | * | 7/1993 | Bickel ...................... 280/166 |
| 5,358,268 A | * | 10/1994 | Hawkins .................. 280/166 |
| 5,501,475 A | * | 3/1996 | Bundy ..................... 280/166 |
| 5,547,040 A | | 8/1996 | Hanser et al. |
| 5,584,493 A | | 12/1996 | Demski et al. |
| 6,135,472 A | * | 10/2000 | Wilson et al. ............. 280/166 |

* cited by examiner

Primary Examiner—Hau Phan
(74) Attorney, Agent, or Firm—Clark Hill PLC

(57) ABSTRACT

A running board assembly for a motor vehicle has a step for supporting an individual thereon. The running board assembly also includes a slide assembly extending between the step and the motor vehicle for slidably moving the step between a retracted position and an extended position. In addition, the running board assembly includes a pneumatic cylinder operatively engaging the slide assembly so that the pneumatic cylinder effects energizing movement between the retracted and the extended positions.

9 Claims, 3 Drawing Sheets

POWERED DEPLOYABLE RUNNING BOARD

RELATED APPLICATION

This application claims priority to and all the benefits of U.S. Provisional Application No. 60/404,543, filed on Aug. 16, 2002.

FIELD OF THE INVENTION

The invention relates to running boards for motor vehicles. More particularly, this invention relates to a running board movable between a retracted position and an extended position.

DESCRIPTION OF THE RELATED ART

Running boards are a popular option for motor vehicles having a high ground clearance, such as pick-up trucks and sport-utility vehicles. The running boards assist individuals in entering and exiting the motor vehicle by allowing individuals to use the running board as a step. Running boards are used as steps extending longitudinally alongside the motor vehicle and secured thereto by a plurality of mounting brackets.

Running boards that can be moved between a deployed position for supporting an individual and a stowed position tucked underneath the motor vehicle are well-known in the art. The stowed position is desirable from an aesthetic standpoint in that a stowed running board is not visible and, therefore, does not detract from the overall appearance of the motor vehicle.

One example of a movable running board utilizes a four bar linkage to swing a step downwards and out from the motor vehicle to move the step between the deployed and stowed positions. Another example of a movable running board teaches pivotal movement of the step between the deployed and stowed positions. A problem common in both of these running boards is that the step is rotated by the linkage through a path that extends below the deployed position. More specifically, these systems are designed to rotate the step from a stowed position down and around that takes the step closer to the ground than its eventual deployed position. This downward movement may be impeded by various obstacles, such as mud or snow, that may accumulate underneath the motor vehicle while parked. Thus, the step may become stuck in the deployed position, the stowed position, or a position therebetween, resulting in running board failure.

Electrically powered running boards have been developed for moving the step between the deployed and stowed positions. In an electrically powered running board, an electric motor is mounted to the motor vehicle to drive a clutch and gear set for movement of the running board. Electrically powered running boards, however, create electrical emissions that interfere with radio reception. Electric running boards also require the addition of a multitude of parts to the motor vehicle. In addition, because electrically powered running boards also incorporate downward movement of the step for deployment, these running boards encounter the same problem of interference from mud, snow, or other impediments underneath the motor vehicle as non-electric powered deployable running boards.

SUMMARY OF THE INVENTION

The disadvantages of the prior art may be overcome by providing a running board that deploys between retracted and extended positions in substantially a single plane.

According to one aspect of the invention, there is provided a running board assembly for a motor vehicle that includes a step for supporting an individual thereon. The running board assembly also includes a slide assembly extending between the step and the motor vehicle for slidably moving the step between a retracted position and an extended position. In addition, the running board assembly includes a pneumatic cylinder operatively engaging the slide assembly so that the pneumatic cylinder effects energizing movement between the retracted and the extended positions in substantially a single plane.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENTS

Referring to the Figures, a running board assembly, generally indicated at 10, extends longitudinally along a side 12 of a motor vehicle 14. The running board assembly 10 includes a step 16 positioned below a door 18 that may be used by individuals when entering and exiting the motor vehicle 14.

Figure 1:
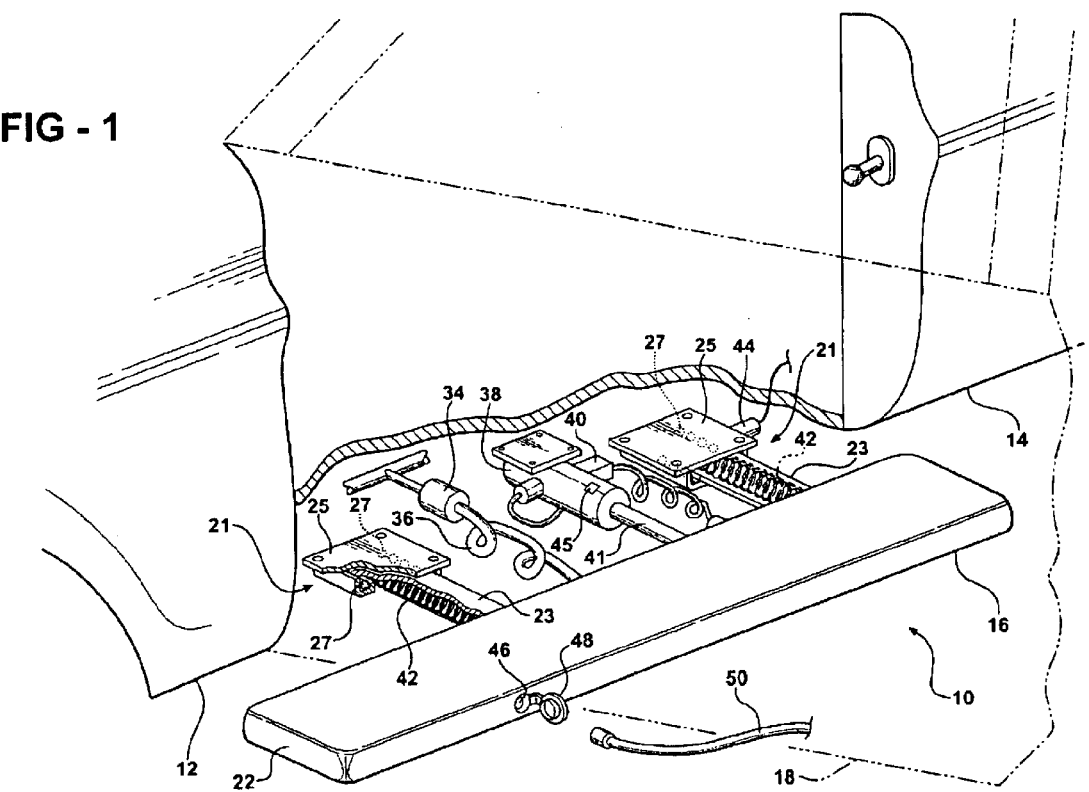
FIG. 1 is a side view of a motor vehicle and a running board assembly of one embodiment of the invention.
Figure 2:
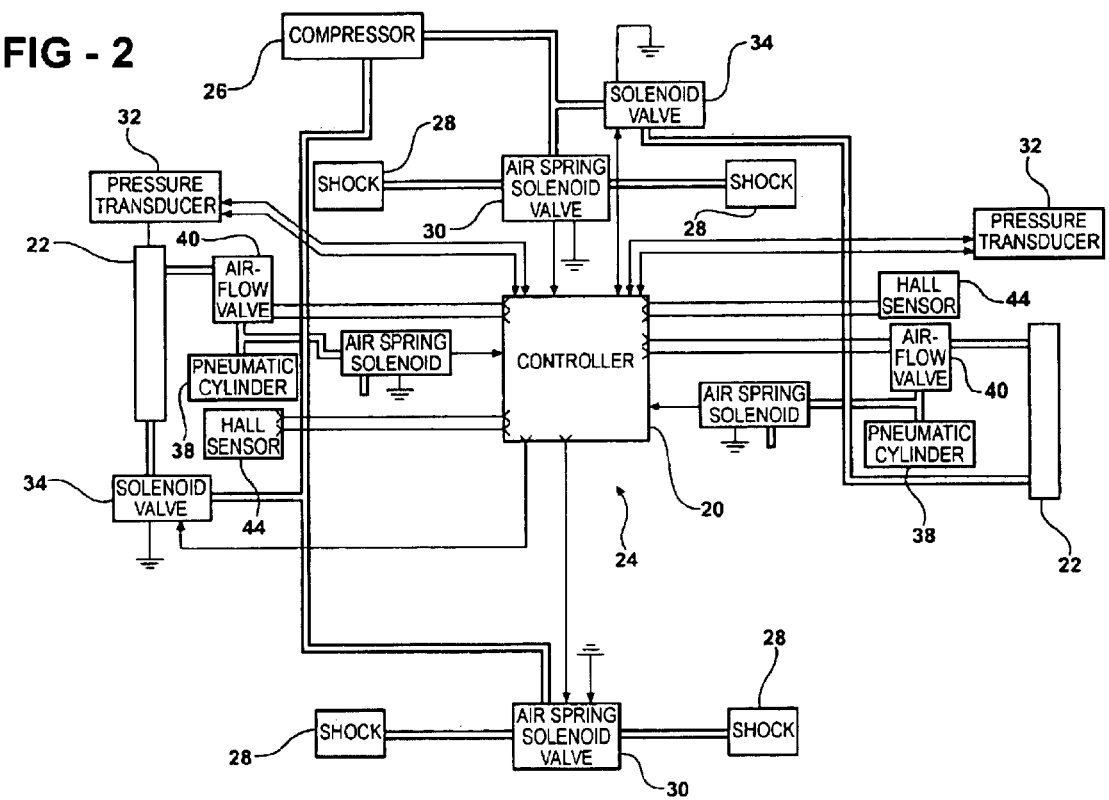
FIG. 2 is a schematic view of an air suspension system and the running board assembly of one embodiment of the invention.
Figure 3:
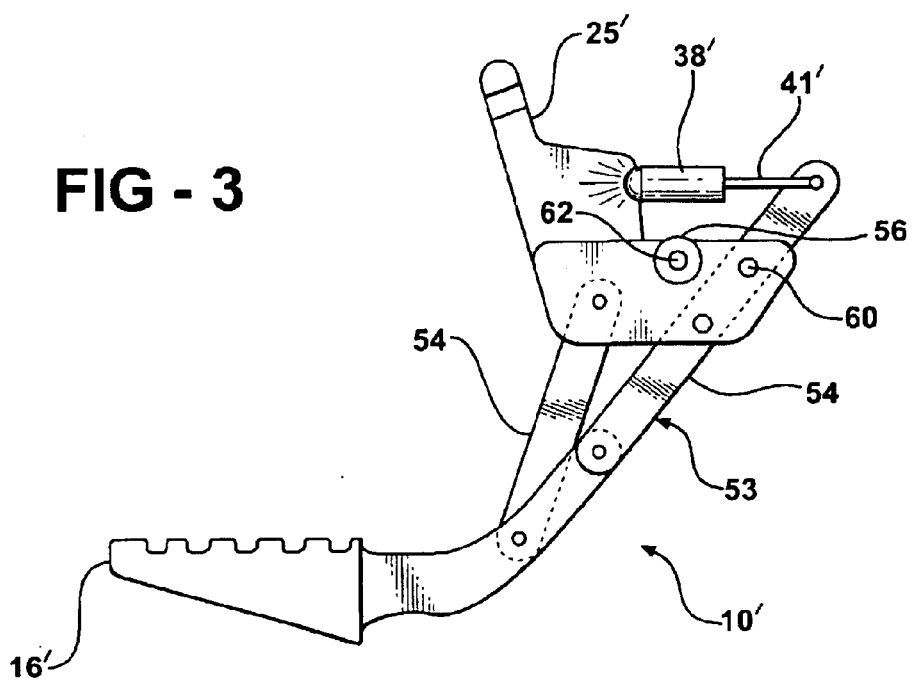
FIG. 3 is a side view of a running board assembly of a second embodiment of the invention.

The step 16 is movable between an extended, operative or deployed position (as seen in FIG. 1) for supporting an individual thereon and a retracted or stored position underneath the side 12 of the motor vehicle 14. The movement of the step 16 between the retracted and extended positions is a linear sliding or telescoping movement in substantially a single plane, preferably horizontal. Due to this linear sliding movement, the step 16 is always oriented upwardly keeping it relatively clean while keeping it close to the underside of the motor vehicle 14. The sliding movement of the step 16 is initiated by signals generated by a controller 20 upon the opening or closing of the door 18 and responsive to a dome light switch.

The step 16 is hollow defining a tank or reservoir 22 for storing a supply of a working fluid, preferably air, therewithin. The step 16 preferably has an elongated tubular shape as shown in FIG. 1. However, the step 16 may have any of a number of shapes so long as the chosen shape provides for storing a supply of a working fluid or gas therewithin. The step 16 may be formed from a variety of materials including, but not limited to, steel, aluminum, or composite materials. The tank 22 should be sufficiently reinforced to contain the pressurized fluid stored therein without leakage and deformation.

A compressor 26 supplies the tank 22 with fluid under pressure. The fluid or gas in the tank 22 is used to force or drive the step 16 from the retracted position toward the extended position. In addition, the fluid or gas in the tank 22 can be accessed for other applications, as described in further detail below.

An air suspension system, generally indicated at 24, supports motor vehicle weight and reduces shock forces created during operation. The air suspension system 24 includes the compressor 26 and a plurality of shocks or struts 28, which control, or dampen, excessive suspension movement. The compressor 26 supplies fluid or gas to the tank 22 and the plurality of shocks 28. The controller 20 sends and receives signals to control the operation of the compressor 26. A plurality of air spring solenoid valves 30 selectively control the amount of air delivered into the plurality of shocks 28 based on signals received from the controller 20.

A pressure transducer 32 is operatively secured to the tank 22 to monitor the fluid or gas pressure therewithin. The pressure transducer 32 communicates the fluid or gas pressure level in the tank 22 to the controller 20. When the fluid or gas pressure in the tank 22 falls below a predetermined level, the pressure transducer 32 sends a fill signal to the controller 20. A solenoid valve 34 selectively controls the amount of fluid or gas flowing from the compressor 26 into the tank 22. As a result of the fill signal, the controller 20 opens the solenoid valve 34 to allow fluid or gas to flow from the compressor 26 to the tank 22. Fluid or gas flows into the tank 22 via a line 36, which extends between the tank 22 and the solenoid valve 34. When the tank 22 has been refilled and a desired pressure is achieved, the pressure transducer 32 sends a fill signal to the controller 20, which in turn, turns off the solenoid valve 34.

To effect movement of the step 16 between the retracted and extended positions, the running board assembly 10 also includes a mounting assembly 21 and a pneumatic cylinder 38. The mounting assembly 21 is fixedly secured between the step 16 and the motor vehicle 14. The mounting assembly 21 includes a slide 23 extending between the step 16 and the motor vehicle 14. A mounting bracket 25 is mounted on the slide 23. The mounting bracket 25 includes a plurality of ball bearings 27 to reduce frictional movement of the mounting bracket 25 and is guided thereby as it moves along the slide 23. The mounting assembly 21 provides a path along which the step 16 moves between the retracted and extended positions.

The pneumatic cylinder 38 extends between the mounting bracket 25 or motor vehicle 14 and the step 16 to operatively move the step 16 between the retracted and extended positions. The pneumatic cylinder 38 includes an airflow valve 40, which is in fluid communication with the tank 22. The airflow valve 40 selectively controls the amount of fluid or gas flowing into and out of the pneumatic cylinder 38 in response to signals it receives from the controller 20.

When the door 18 is opened, the controller 20 generates a door ajar signal, which is sent to the airflow valve 40. The airflow valve 40 opens in response to the door ajar signal and fluid or gas is released from the tank 22 into the pneumatic cylinder 38. The incoming fluid or gas causes a plunger 41 to move within the pneumatic cylinder 38 to force the step 16 to move to its extended position. Now, the step 16 is available to support the individual as they enter or exit the motor vehicle 14.

A spring 42 also extends between the motor vehicle 14 and the step 16. Upon opening of the door 18, the spring 42 expands as fluid or gas flows into the pneumatic cylinder 38 and the step 16 moves to its extended position. When the door 18 is closed, the controller 20 ceases to generate a door ajar signal and the airflow valve 40 releases fluid or gas out of the pneumatic cylinder 38 allowing the spring 42 to compress to its steady state condition. As the spring 42 compresses, the spring 42 urges the step 16 into its retracted position underneath the motor vehicle 14.

There may be times when the door 18 is opened and an individual prepares to exit the motor vehicle 14, but then decides to close the door 18 after only partially opening the door. In these situations, the running board assembly 10 will operate as described above, but for the fact that the step 16 may not reach the extended position before it returns to the retracted position.

There is a preference that the step 16 be moved from the retracted position to the extended position less than approximately 2.0 seconds of opening of the door 18 so that the step 16 is ready for use as the individual exits the motor vehicle 14. A Hall effect sensor 44 measures the speed of the step 16 as it moves to the extended position. The Hall effect sensor 44 relays the step speed to the controller 20, which may send a signal to the airflow valve 40 to increase or decrease the rate of fluid or gas flowing into or out of the pneumatic cylinder 38 so that the speed of the step 16 can be regulated and adjusted accordingly.

In cases in which the step 16 fails to move between positions, for example when the airflow valve 40 fails to release the fluid or gas from the pneumatic cylinder 38, an air bleeder screw 45 is provided to ensure that the step 16 may be moved back to the retracted position. The air bleeder screw 45 is in communication with the airflow valve 40. When the step 16 is stuck, the air bleeder screw 45 may be manually opened to bleed the remaining air in the pneumatic cylinder 38 out therefrom, thus allowing the spring 42 to compress and to pull the step 16 to its retracted position.

In addition, it should be appreciated that the tank 22 need not be positioned within the step 16. In other embodiments, the tank 22 may be positioned in other areas of the motor vehicle 14 so long as the fluid or gas stored therewithin is transportable to a mechanism to initiate movement of the step 16 from the retracted position to the deployed position. For example, the tank 22 may be part of the air suspension system 24.

Air within the tank 22 may be used for many applications besides powering the step 16 between the retracted and extended positions. For these other applications, the step 16 defines a valved port 46 along an external surface thereof. The port 46 is selectively covered by a cap 48. A hose 50 can be matingly engaged to the port 46 to access the air inside the tank 22. For example, the air in the tank 22 may be used to increase the air pressure of the motor vehicle tires (not shown). In addition, the hose 50 may be used to provide air to other, non-motor vehicle related items, such as sports equipment or inflatable products.

An actuator 56 may be provided to lock the step 16' in the retracted position. The actuator 56 may be a solenoid powered by fluid or electricity. In operation, the pneumatic cylinder 38' moves the links 54, which moves a locking detent 60 into engagement with the actuator 56. The actuator 56 forces a pin 62 into the locking detent 60 to lock the step 16' in the retracted position. If the actuator 56 is not functioning, the step 16' may be locked in the retracted position by manually pushing the pin 62 through the locking detent 60.

Figure 4:
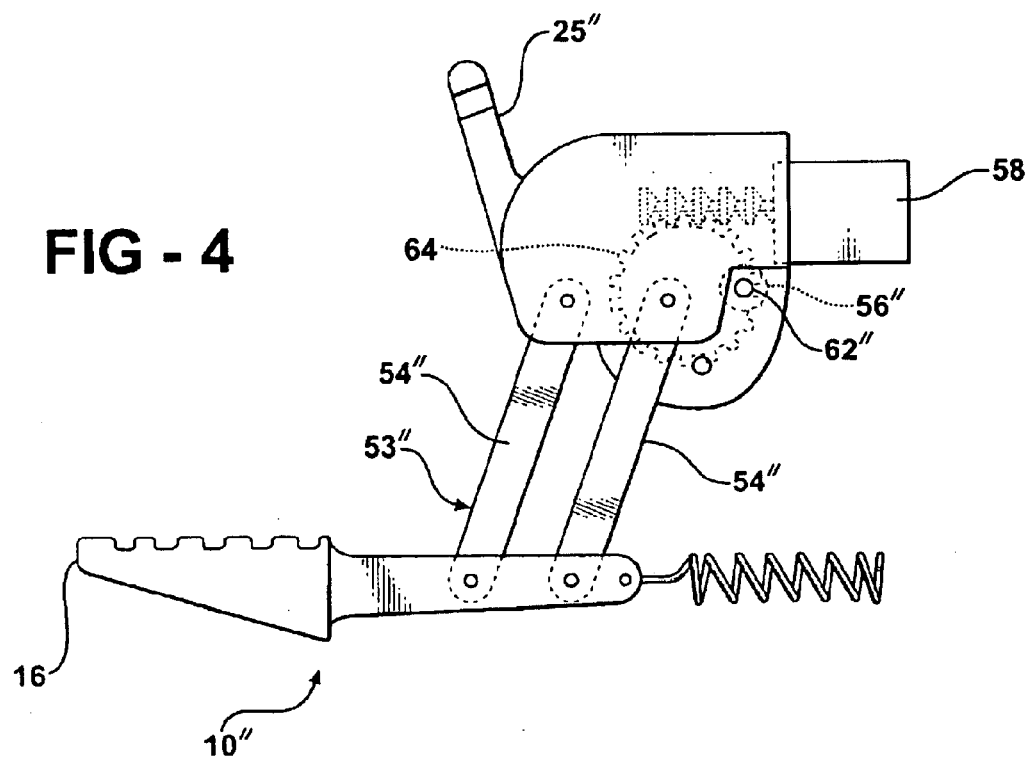
FIG. 4 is a side view of a running board assembly of a third embodiment of the invention.

Referring to FIG. 4, wherein like double primed reference numerals represent similar elements as those described above, mechanical override of the actuator 56" is provided by a backdrive gear 64, which urges the step 16" to move from the retracted position to the extended position. An electric motor 58 provides additional power to move the step 16" to the extended position in colder temperatures.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed is:

1. A running board assembly for a motor vehicle, said running board assembly comprising:
    a step defining a tank for storing a supply of pressurized fluid;
    a compressor fluidly connected to said tank;
    a mounting assembly extending between said step and the motor vehicle for mounting said running board assembly on said vehicle enabling movement of said step between a retracted position and an extended position;
    a pneumatic cylinder operatively engaging said mounting assembly, whereby energizing said pneumatic cylinder effects said movement of said step; and
    wherein said tank has a pressure sensor operatively connected to said compressor enabling said compressor to automatically fill said tank with fluid and maintain pressure within said tank at a desired level.

2. A running board assembly as set forth in claim 1 including a spring extending between said step and the motor vehicle urging said step to said retracted position.

3. A running board assembly as set forth in claim 2 wherein said pneumatic cylinder includes a valve for fluidly communicating fluid into and out of said pneumatic cylinder.

4. A running board assembly as set forth in claim 3 including a solenoid valve for opening said tank allowing said tank to receive compressed fluids.

5. A running board assembly as set forth in claim 4 including a controller for operating said valve and said solenoid valve.

6. A running board assembly as set forth in claim 5 wherein said step has a valved port selectively providing access to pressurized air inside said tank.

7. A running board assembly as set forth in claim 6, wherein said operative connection is via a controller.

8. A running board assembly as set forth in claim 7, wherein the speed of said movement of said step is regulated to move at a desired rate of movement between said retracted and extended positions.

9. A running board assembly as set forth in claim 8, wherein said cylinder has a valve operatively connected to said controller, and said controller includes a sensor mounted to measure speed of said sliding movement, whereby based on signals received from said sensor, said controller responsively opens and closes said valve to regulate said speed.

* * * * *

UNITED STATES PATENT AND TRADEMARK OFFICE
CERTIFICATE OF CORRECTION

PATENT NO. : 6,926,295 B2
DATED : August 9, 2005
INVENTOR(S) : Thomas E. Berkebile et al.

It is certified that error appears in the above-identified patent and that said Letters Patent is hereby corrected as shown below:

Title page,
Item [75], Inventors, should be -- Wojtaszek -- and not "Wejtaszek.".

Signed and Sealed this

Eleventh Day of October, 2005

JON W. DUDAS
*Director of the United States Patent and Trademark Office*